United States Patent [19]

Uegane et al.

[11] Patent Number: 5,321,214
[45] Date of Patent: Jun. 14, 1994

[54] ARRANGEMENT FOR DISPOSING SILENCER OF AUTOMOBILE

[75] Inventors: Masayuki Uegane; Akinori Sugimoto, both of Wako, Japan

[73] Assignee: Honda Giken Kogyo Kabushiki Kaisha, Tokyo, Japan

[21] Appl. No.: 988,263

[22] Filed: Dec. 14, 1992

[30] Foreign Application Priority Data

Dec. 19, 1991 [JP] Japan .................. 3-337292

[51] Int. Cl.⁵ .............................. F01N 5/00
[52] U.S. Cl. .................... 181/211; 181/246; 181/252; 181/282
[58] Field of Search .......... 181/243, 245, 246, 248, 181/249, 252, 255, 256, 282, 211

[56] References Cited

U.S. PATENT DOCUMENTS

| | | | |
|---|---|---|---|
| 4,589,516 | 5/1986 | Inoue et al. | 181/256 |
| 4,909,348 | 3/1990 | Harwood et al. | 181/282 |
| 4,993,513 | 2/1991 | Inoue et al. | 181/282 |

Primary Examiner—Michael L. Gellner
Assistant Examiner—Khanh Dang
Attorney, Agent, or Firm—Armstrong, Westerman, Hattori, McLeland & Naughton

[57] ABSTRACT

In an automobile, a silencer connected to an exhaust pipe includes a casing made of thermally resistant synthetic resin and provided at an inner surface with a thermally insulating material. The silencer is disposed between a side frame and a side body and covered with an undercover from below the silencer and is disposed between a side frame and a side body of an automatic vehicle in a space behind a rear wheel.

4 Claims, 5 Drawing Sheets

ARRANGEMENT FOR DISPOSING SILENCER OF AUTOMOBILE

BACKGROUND OF THE INVENTION

1. Field of the Invention

The present invention relates to a silencer and particularly, to an improvement in disposition of an automobile silencer.

2. Description of the Prior Art

In a conventional automobile, a casing of a silencer is made of metal and, hence, the shape of the casing is limited. Moreover, the temperature of an outer surface of the casing may be risen to a relatively high level, resulting in a need to avoid a damage to adjacent members due to heat. For this reason, the disposition of the silencer is also limited and, in general, the silencer is disposed in a downwardly exposed state at a rear portion of a vehicle body.

However, if the silencer is disposed in an exposed state, as described above, a flow of air is disturbed by the silencer during travelling of the vehicle, which is disadvantageous from the viewpoint of aerodynamic characteristics. In addition, the silencer can been seen in the exposed state from the rear of the vehicle, which is also disadvantageous from the viewpoint of the design of the vehicle.

In a conventional automobile, a free, or unoccupied, space is produced between a side body and a side frame in the rear of a rear wheel. If the silencer can be disposed in such free space, the problems in the viewpoints of the aerodynamic characteristic and design of the vehicle can be overcome.

SUMMARY OF THE INVENTION

Accordingly, it is an object of the present invention to provide an arrangement for disposing a silencer of an automobile, wherein a silencer can be disposed in a superior manner from the viewpoints of the aerodynamic characteristic and the design, with a widened range of selection of the shape thereof, while preventing an adverse affection of heat being exerted to adjacent members.

To achieve the above object, according to the present invention, there is provided an arrangement for disposing a silencer of an automobile, comprising a silencer connected to an exhaust pipe and including a casing which is made of thermally resistant synthetic resin and which is provided at an inner surface of the casing with a thermally insulating material, the silencer being disposed between a side frame and a side body in the rear of a rear wheel and covered with an undercover from below.

With such construction, it is ensured that the aerodynamic characteristic and the external appearance of the automobile are excellent. In addition, the periphery of the silencer, made of resin having a relatively low strength is covered with the side frame, the side body and the undercover. Therefore, the silencer can be prevented from being externally damaged by splashing of a stone or the like. Further, space between the side frame and the side body, which has been a free space in the past, is utilized effectively and therefore, the vehicle need not be increased in size.

The above and other objects, features and advantages of the invention will become apparent from the following description of a preferred embodiment, taken in conjunction with the accompanying drawings.

BRIEF DESCRIPTION OF THE DRAWINGS

FIGS. 1 to 5 illustrate a preferred embodiment of the present invention, wherein FIG. 1 is a cross-sectional schematic view of the automobile taken from below and looking up;

FIG. 2 is an enlarged sectional view taken along line 2—2 in FIG. 1;

FIG. 3 is a sectional view taken along a line 3—3 in FIG. 2;

FIG. 4 is a sectional view taken along a line 4—4 in FIG. 2; and

FIG. 5 is a partially cutaway plan view of a silencer.

DESCRIPTION OF THE PREFERRED EMBODIMENT

The present invention will now be described by way of a preferred embodiment in connection with the accompanying drawings.

Figure 1:
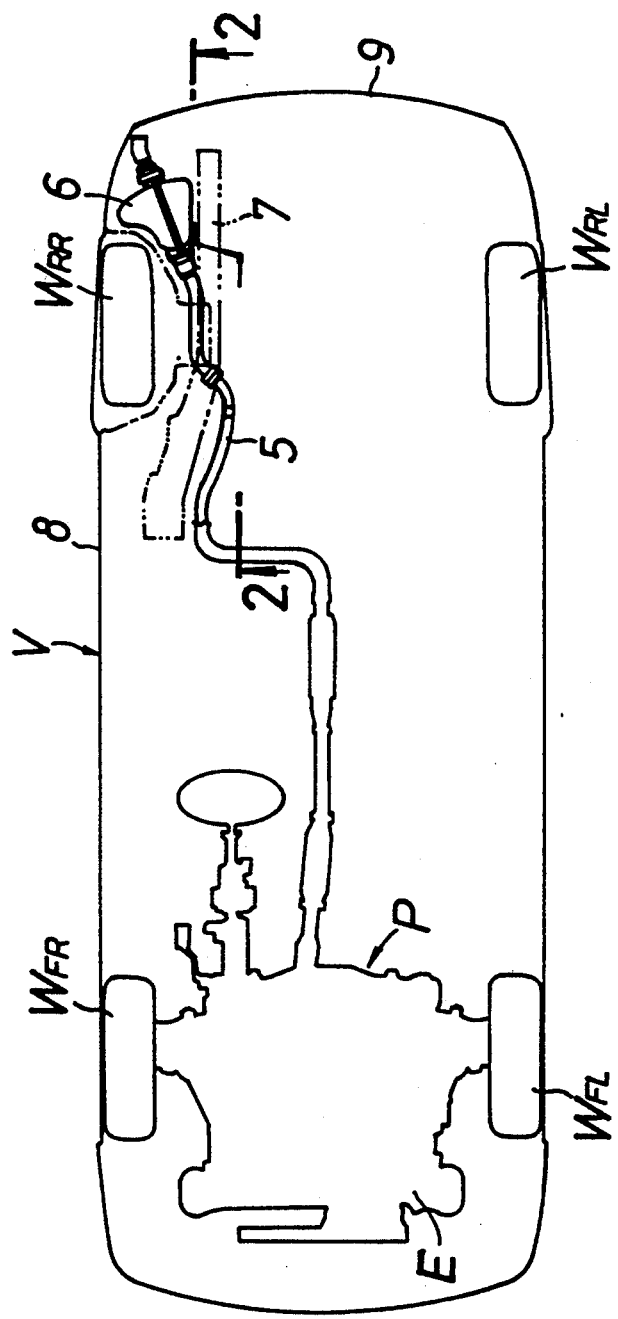

Referring first to FIG. 1, an automobile vehicle V comprises left and right front wheels $W_{FL}$ and $W_{FR}$ and left and right rear wheels $W_{RL}$ and $W_{RR}$. A power unit P, including an engine E, mounted at a front portion of vehicle V. A silencer 6 is connected to an exhaust pipe 5 which is connected to the engine E and extends rearwardly.

Figure 2:
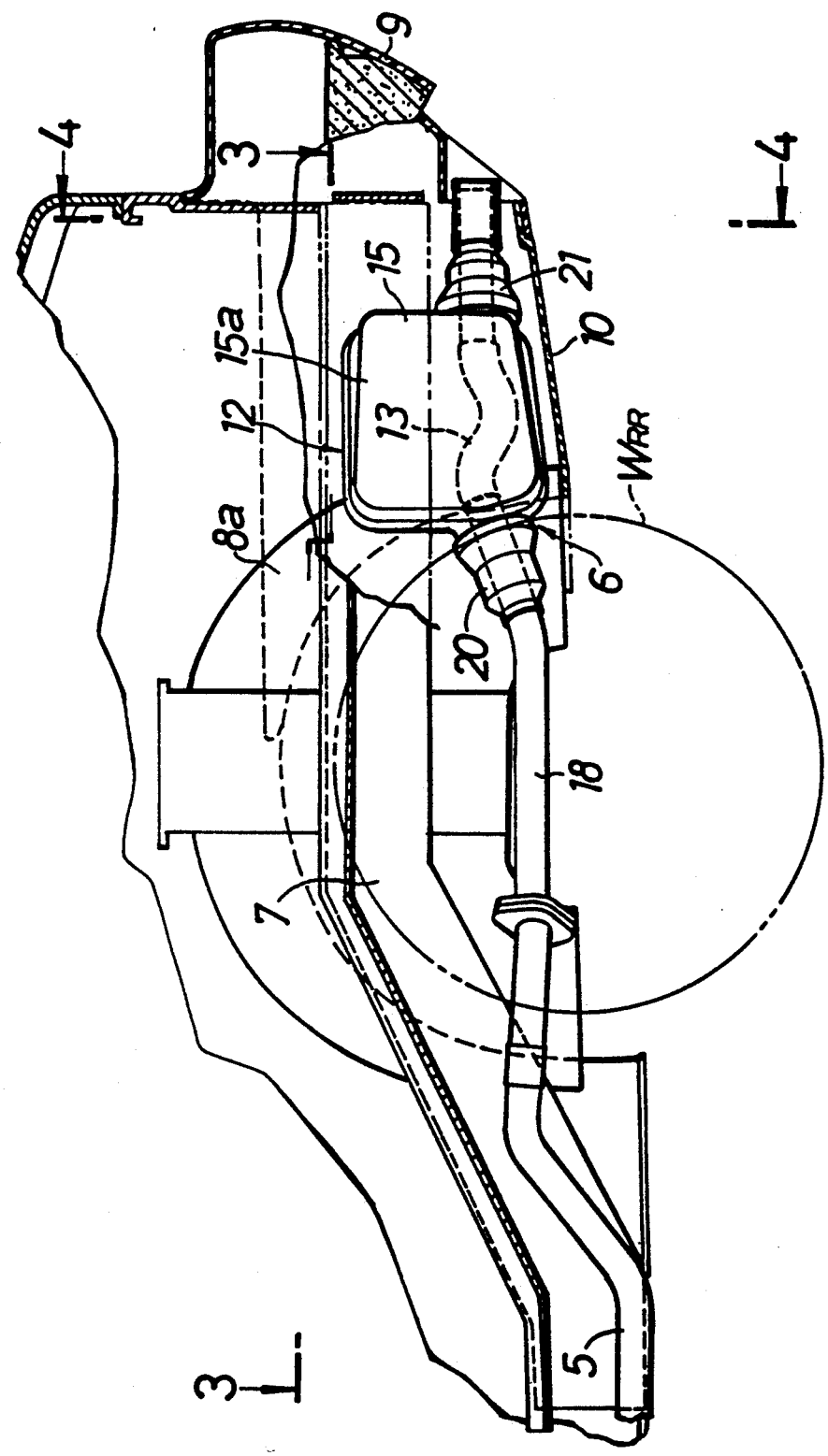
Figure 3:
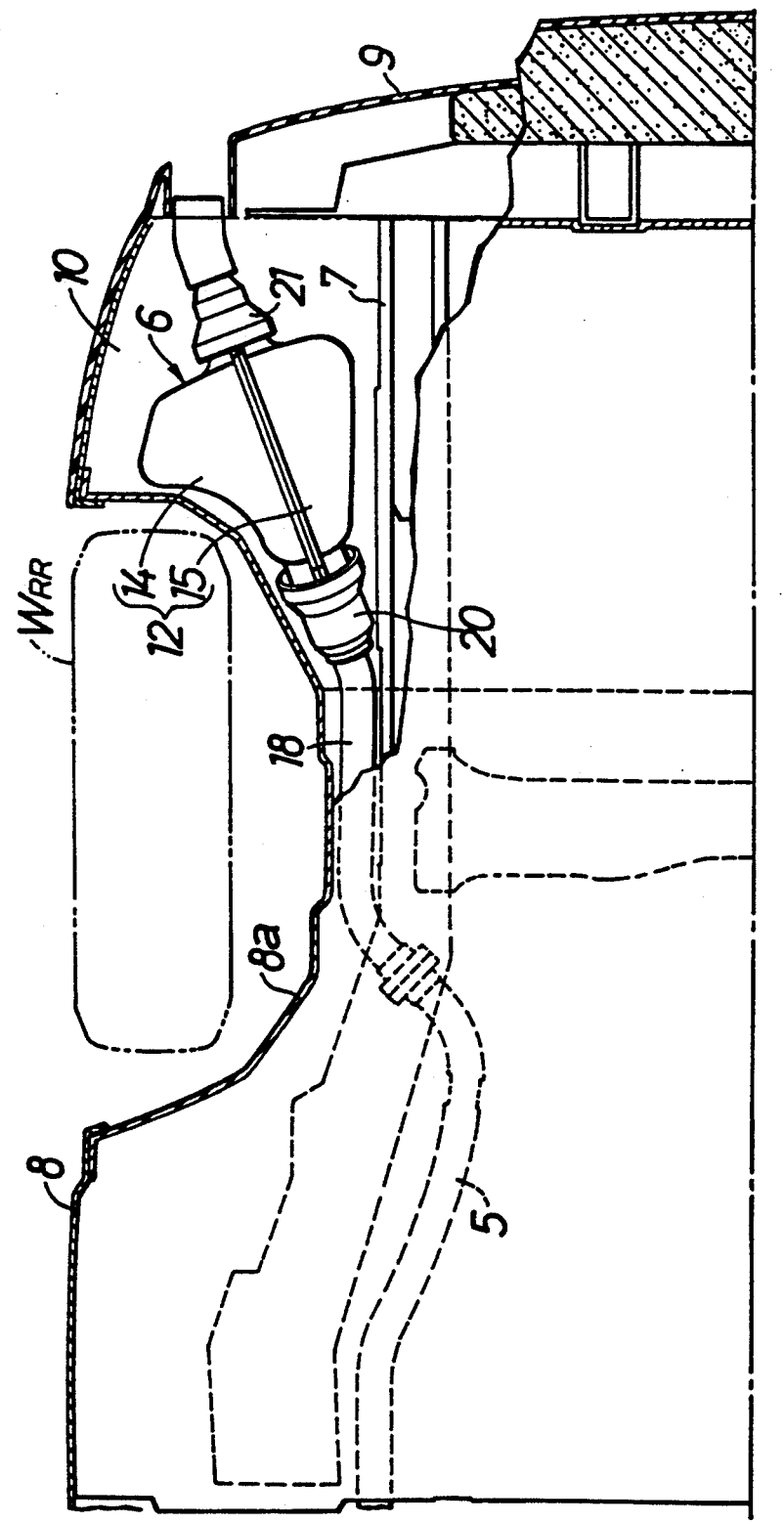
Figure 4:
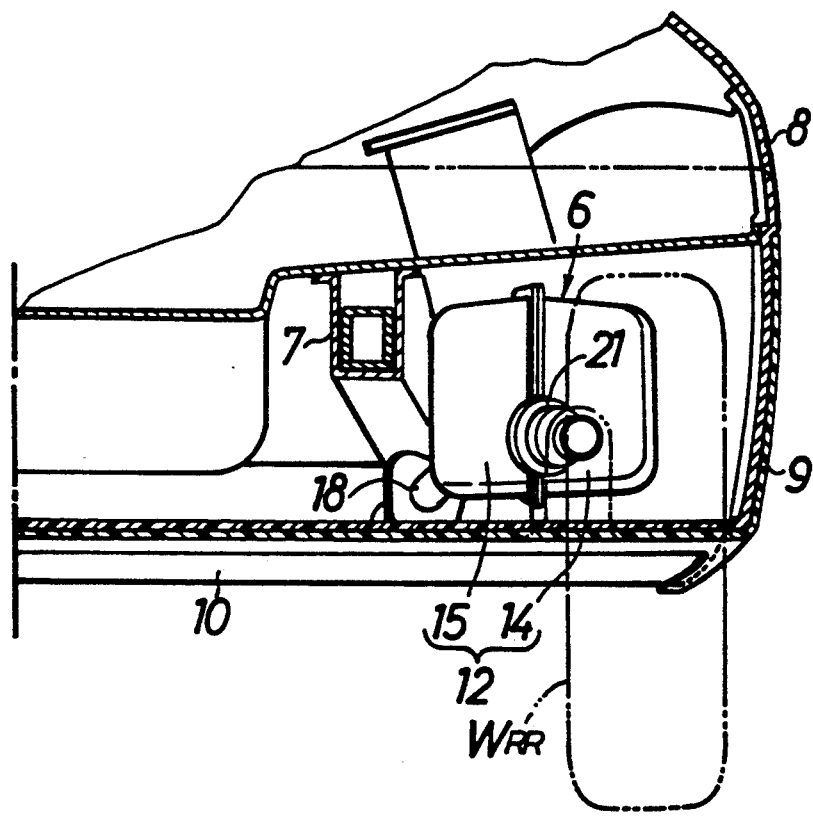

Referring to FIGS. 2 and 4, a right side frame 7, forming a portion of a framework of the vehicle V is disposed inside a right side body 8, FIG. 3, and extends longitudinally. The silencer 6 is disposed between side body 8 and side frame 7, in the rear of right rear wheel $W_{RR}$, i.e., in rear of wheel housing 8a on the right side of body 8 to accommodate the right rear wheel $W_{RR}$.

A rear bumper 9 is mounted at a rear portion of vehicle V and connected to side frame 7. A rear portion of silencer 6 is covered with the rear bumper 9 An undercover 10 is connected to the rear bumper 9 for covering silencer 6 from below.

Figure 5:
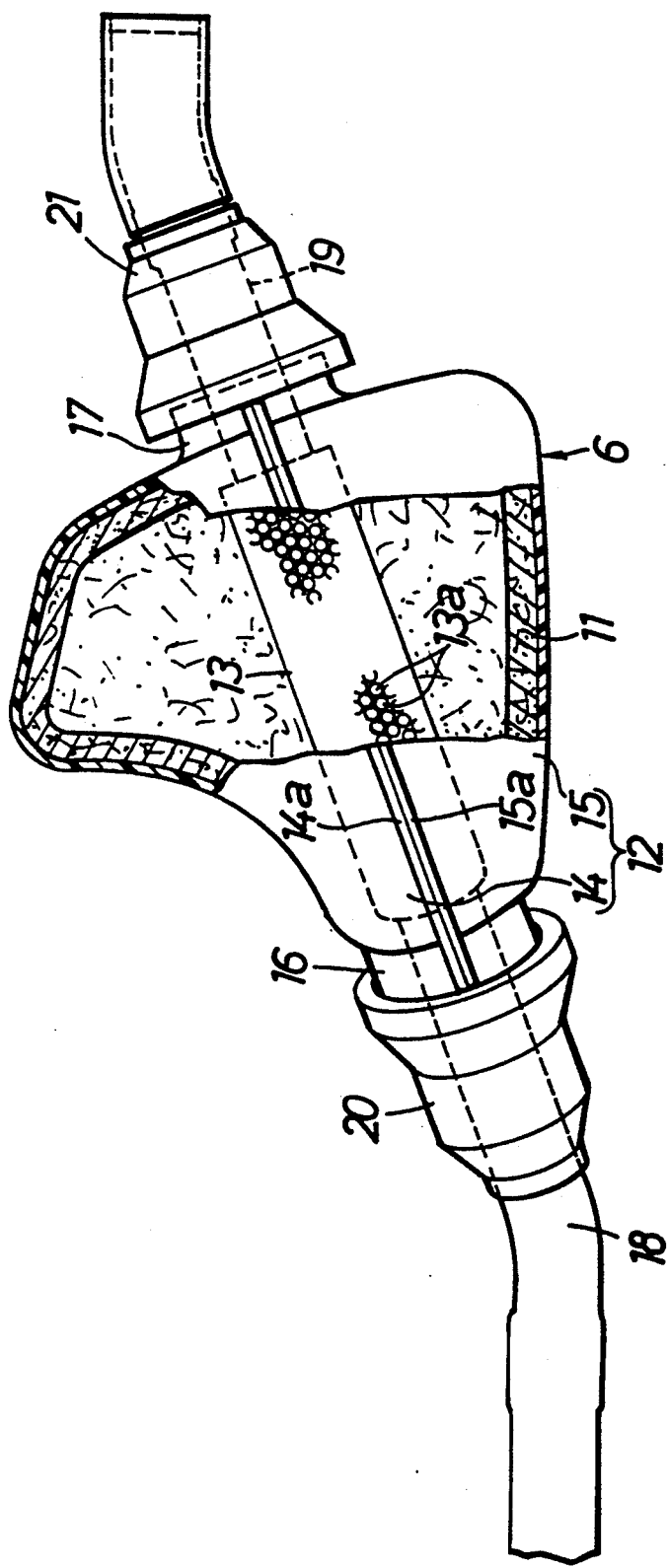

Referring to FIG. 5, silencer 6 comprises a casing 12 lined with glass wool 11, serving as a thermally insulating material, and an inner pipe 13 disposed with casing 12 and having an infinite number of through holes 13a. The casing 12 is formed of thermally resistant synthetic resin, e.g., a phenolic sheet molding compound resin (SMC) and is comprised of a pair of casing halves 14 and 15 coupled with each other at their flange portions 14a and 15a by an adhesive, or the like. Connecting pipe portions 16 and 17, extending on opposite ends of casing 12 are formed between the respective coupled surface of casing halves 14 and 15. An inner pipe 13 is connected at one end thereof to an introduction pipe 18 connected to exhaust pipe 5, FIGS. 2 and 3, and inserted through the connecting pipe portions 16 into casing 12. The other end of inner pipe 13 is connected to discharge pipe 19 inserted through connecting pipe portion 17 into casing 12. Further, introduction pipe 18 and the discharge pipe 19 are coupled to the connecting pipe portions 16 and 17 by joint members 20 and 21 which are resiliently engaged with connecting pipe portions 16 and 17.

With the silencer in this embodiment, the casing 12 can be easily worked into various shapes. Because casing 12 is made of thermally resistant synthetic resin, it is possible to widen the range of selection of the shape of silencer 6. Therefore, even if the space between the side body 8 and the side frame 7 at the rear of right rear wheel W$_{RR}$ is complicated in shape, the silencer 6 can be correspondingly shaped. In addition, the temperature of the outer surface of the casing 12 is suppressed, at a relatively low level, by the fact that the glass wool 11 is mounted on the inner surface of the casing 12. Therefore, even if the space between the side body 8 and the side frame 7 is narrow, members or components around such space are prevented from being damaged by heat.

Moreover, because the silencer 6 is disposed between side body 8 and side frame 7 at the rear of right rear wheel W$_{RR}$, a sufficient height of the silencer from the ground can be obtained for covering the lower portion with the undercover 10. The exposed disposition of the silencer 6 is avoided by covering the silencer 6 with the undercover 10. This ensures that the flow of air is not disturbed by the silencer 6 during travel of the vehicle V, thereby enabling an improvement in aerodynamic characteristic. The silencer 6 cannot be viewed from the rear of the vehicle V, thereby providing a design excellent in external appearance of the vehicle.

Further, although silencer 6 is made of resin having a lower strength, as compared with a conventional silencer made of metal, because the periphery of the silencer 6 is covered with side body 8, side frame 7 and undercover 10, silencer 6 is protected from being damaged by splashing-up of a stone or the like. Because the silencer 6 is disposed by utilizing existing space between the side body 8 and the side frame 7, which has been a dead space in the past, the vehicle size is not increased.

What is claimed is:

1. A vehicle silencer system, comprising:
    a silencer connected to an exhaust pipe of a vehicle;
    said silencer having a casing made of thermally resistant synthetic resin having a thermally insulating material provided at an inner surface of said casing;
    said vehicle having right and left sides and front and rear ends;
    said vehicle having a side body delineating one of said sides of the vehicle and having a side frame disposed inside from the side body between the right and left sides, at least a portion of a rear wheel being between said side body and said side frame;
    said silencer being disposed between said side frame and said side body of the vehicle at a rear of said rear wheel and being covered with an undercover which is fixed to said vehicle such that said undercover covers a lower surface of said silencer from below the silencer.

2. The vehicle silencer system according to claim 1, wherein said vehicle has a wheel housing mounted on said side body for accommodating said rear wheel and wherein said silencer is formed into a configuration with a width thereof in a direction between said right and left sides gradually widening in a rearward direction towards the rear of the vehicle; and extending along a rear portion of said wheel housing.

3. The vehicle silencer system according to claim 1, wherein said casing includes a pair of casing halves, and wherein said silencer includes an introduction pipe for introducing an exhaust gas into said silencer and a discharge pipe for discharging said exhaust gas from said silencer, said casing halves having coupled surfaces connected to one another, and said introduction pipe and discharge pipe being disposed in connecting pipe portions formed between the coupled surfaces of said casing halves.

4. The vehicle silencer system according to claim 1, 2 or 3, wherein said thermally insulating material is a glass wool lined on said casing.

* * * * *